July 6, 1937.  L. M. WEEKS  2,085,883
STRING TENSION GAUGE
Filed March 23, 1936

INVENTOR
L. M. Weeks
BY
ATTORNEY

Patented July 6, 1937

2,085,883

UNITED STATES PATENT OFFICE 2,085,883

STRING TENSION GAUGE

Leonard M. Weeks, Modesto, Calif.

Application March 23, 1936, Serial No. 70,179

3 Claims. (Cl. 265—1.6)

This invention relates generally to gauges and is directed in particular to a gauge device for testing the tension of the strings of a tennis racket.

It is very important that the strings of a tennis racket be drawn up to substantially equal tension throughout in order to assure the best service from the racket. In stringing a tennis racket, it is the present practice to use a tension gauge which is disposed exteriorly of the racket frame and gauges the tension of the string by drawing on the same outside the frame and prior to the time when the securing awl is wedged into the hole through which the string is threaded.

This type gauge, as above described, is subject to two serious objections: First, the gauge does not operate to indicate loss of string tension which may occur after the awl is wedged into the hole and caused by the string slipping past the awl; secondly, the gauges heretofore used were only usable during the stringing operation and could not be used to test the tension of the strings after the racket was strung.

It is therefore the principal object of my invention to provide a gauge for tennis racket strings which will test the tension thereof between the sides of the racket frame thereby positively indicating the tension of the actual playing portion of the strings either during the stringing operation or after the racket is fully strung. With the use of my gauge slippage by the awl while stringing or loosening during play may be readily ascertained.

A further object of my invention is to produce a relatively small gauge of the character described which may be attached to a tennis racket string with one hand and which gauge will then itself remain in place leaving both hands free for the stringing operation.

Though initially designed for testing tennis racket strings, my gauge may also obviously be used for testing the tension of flexible or readily bendable wires, flexible cables and the like.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claims.

In the drawing similar characters of reference indicate corresponding parts in the several views.

Figure 1:
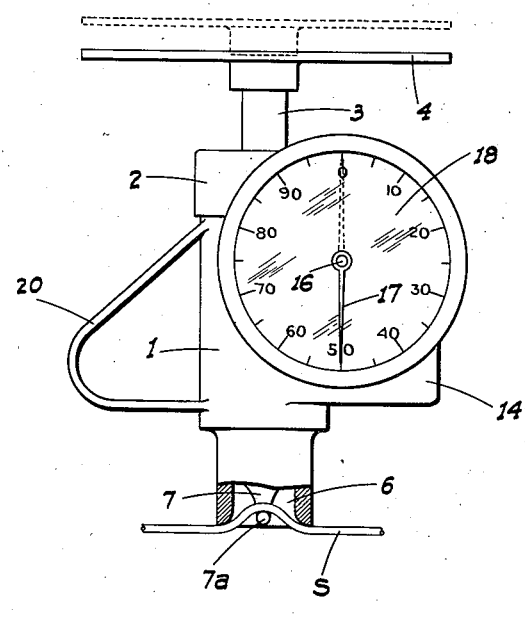
Figure 1 is a front elevation of the gauge, showing a string or wire being gauged for tension.
Figure 2:
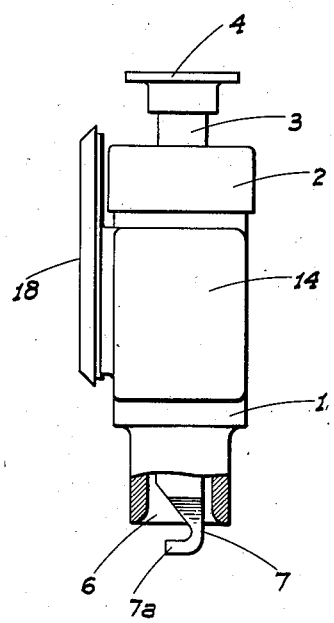
Figure 2 is an end view of the gauge, showing the string engaging hook fully depressed.

Referring now more particularly to the characters of reference on the drawing, the gauge comprises a cylindrical barrel 1 having a cap 2 on its upper end. A relatively small stem 3 is slidable in the barrel and projects through the cap, having a flat cross member or handle pad 4 on its outer end.

A bearing 5 for the lower portion of the stem is formed in the barrel a short distance above its lower end; the bore 6 of the barrel below the bearing forming a socket somewhat larger in diameter than the stem, and its lower edge rounding outwardly. The lower end of the stem is formed as a hook 7, the lower portion of which is preferably circular and extends at right angles to the stem in the form of a pin 7a as plainly shown.

A collar 8 is fixed on the stem under the cap 2, and a washer 9 is disposed about the stem under the collar. Also mounted on the stem below the washer is an inverted cup member 10 of cylindrical form, and a compression spring 11 is disposed about the stem, bearing at one end against the top of the cup and at its opposite end against the shoulder formed by the upper end of bearing 5.

Figure 3:
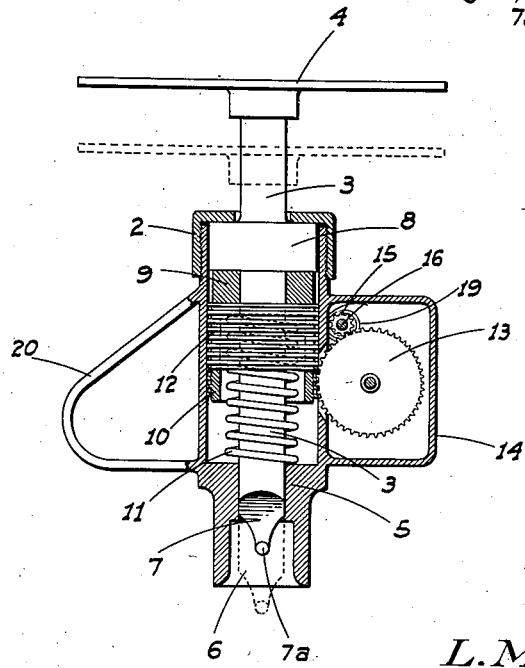
Figure 3 is a sectional elevation of the gauge, showing the hook fully retracted.

The length of the stem is such that when the spring, through the cup and washer, holds the collar 8 against the cap 2, the hook 7 is retracted some distance into the socket 6, as shown in Figure 3. The amount of downward movement permitted the cup, washer, collar and stem as a unit is such that when the cup engages the bearing 5 (and which limits the downward or extending movement of the unit) the hook pin 7a will be below the lower edge of the barrel a sufficient distance to enable a straight string S to freely pass over the pin and under the barrel.

The cup 10 is circumferentially grooved on the outside to form what are in effect rack teeth 12. These engage the teeth of a gear 13 which on one side projects into the barrel and which is mounted in a gear box 14 projecting from the corresponding side of the barrel.

The gear meshes with a pinion 15 in said box, the shaft 16 of said pinion passing from the gear box and having a pointer or needle 17 on its outer end. This needle reads against a dial plate 18 mounted on the front side of the gear box and barrel and disposed concentric with the shaft 16.

The dial is graduated in pounds or other units of pressure or tension, the spring 11 being preferably designed in connection with the other parts to register up to 100 lbs. pressure or tension and the dial being accordingly graduated from 0 to 100 as shown.

The graduations extend completely about the dial, so that slight variations in pressure may be easily read. The ratio of the pinion 15 and gear 13 is such that with the full downward movement of the stem from its upper limit, the needle will make slightly more than a full revolution of the dial.

Variation in movement of the needle relative to a stem movement, due to backlash between the teeth of the gear and pinion, may be avoided by the use of a hair spring 19 connected to shaft 16.

The barrel is provided with a finger engaging handle or ear 20 projecting from the side thereof opposite the gear box, and positioned relative to the member 4 so that when certain fingers of a hand are engaged with the handle, the ball of the same hand may rest on and exert a downward pressure against the member 4, to advance the stem hook from the lower end of the barrel.

In operation, the gauge is grasped in the manner stated, and the stem fully depressed to expose the hook pin. The pin is then lowered to one side of the string to be gauged, while being maintained at right angles thereto. The pin is then caught under the string S, while the latter is engaged on its upper side by the end of the barrel on opposite sides of the socket. The depressing pressure on the stem is then released. The spring 11 will then tend to withdraw the hook into the socket, and the extent to which it can do so depends on the amount of flexing of the string between the barrel on opposite sides and the hook pin, as shown in Figure 1. The amount or extent of such flexing being of course dependent on the tension of the string, the needle 17, whose position is determined by that of the stem and its string engaging hook, will correctly indicate the tension of the string. Since the tension indicating figures on the dial read in increasing order from the upper or hook retracted position of the stem, the less the hook can move to such position, the greater will be the tension reading, as will be evident. With the gauge thus mounted on a string, the latter can be adjusted to increase or decrease its tension (and consequently the flexing of the string adjacent the hook) and the needle will read accordingly. Correct and even tensioning of all the strings may thus be readily and quickly effected.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. A racket-string tension gauge comprising a barrel having a socket in one end, said end of the barrel on opposite sides of the socket forming surfaces for engagement with one side of a string at spaced points thereon, an element in the socket engageable with the opposite side of the string intermediate said spaced points, spring means tending to pull said element into the socket in a direction at right angles to said end of the barrel, and visual tension indicating means operating with such movement of the element.

2. A tension gauge for tennis-racket strings comprising a relatively small barrel having a socket in one end, said end being adapted to be rested on a string to be tensioned, and a spring-pulled element in the socket to engage under such string, and tending to pull the same into the socket; the outer end of the socket being rounded outwardly whereby to prevent injury of a string stretched across the socket and drawn into the same.

3. A string tension gauge comprising a barrel, string engaging and tensioning means mounted in the barrel and including a stem slidably mounted in and projecting from one end of the barrel and adapted to be depressed when said means is to be engaged with a string, a pad on the outer end of the stem for engagement with the palm of a hand, and projections on the barrel on opposite sides thereof for engagement with the fingers of said hand.

LEONARD M. WEEKS.